United States Patent
Steidinger

(10) Patent No.: US 7,901,533 B2
(45) Date of Patent: Mar. 8, 2011

(54) METHOD OF MAKING AN RFID ARTICLE

(75) Inventor: David J. Steidinger, Barrington, IL (US)

(73) Assignee: Tamarack Products, Inc., Wauconda, IL (US)

( * ) Notice: Subject to any disclaimer, the term of this patent is extended or adjusted under 35 U.S.C. 154(b) by 797 days.

(21) Appl. No.: 11/770,398

(22) Filed: Jun. 28, 2007

(65) Prior Publication Data

US 2008/0088448 A1 Apr. 17, 2008

Related U.S. Application Data

(60) Provisional application No. 60/818,185, filed on Jun. 30, 2006.

(51) Int. Cl.
- B29C 65/48 (2006.01)
- B32B 37/00 (2006.01)
- B32B 38/04 (2006.01)
- B32B 38/14 (2006.01)
- B32B 43/00 (2006.01)
- G08B 13/24 (2006.01)

(52) U.S. Cl. ......... 156/247; 156/265; 156/277; 156/278; 156/289; 156/302

(58) Field of Classification Search .................. 156/247, 156/265, 277, 278, 289, 299, 301, 302; 340/572.1, 340/572.4, 572.7–572.9, 10.4; 343/719, 343/787; 428/40.1, 41.3

See application file for complete search history.

(56) References Cited

U.S. PATENT DOCUMENTS

| | | | |
|---|---|---|---|
| 2,990,081 A | 6/1961 | DeNeui et al. | |
| 5,528,222 A | 6/1996 | Moskowitz et al. | |
| 5,867,102 A | 2/1999 | Souder et al. | |
| 5,973,600 A | 10/1999 | Mosher et al. | |
| 6,018,299 A | 1/2000 | Eberhardt et al. | |
| 6,019,865 A | 2/2000 | Palmer et al. | |
| 6,107,920 A | 8/2000 | Eberhardt et al. | |
| 6,130,613 A | 10/2000 | Eberhardt et al. | |
| 6,147,604 A * | 11/2000 | Wiklof et al. | 340/572.1 |
| 6,147,662 A * | 11/2000 | Grabau et al. | 343/895 |
| 6,172,608 B1 | 1/2001 | Cole | |
| 6,207,001 B1 | 3/2001 | Steidinger et al. | |
| 6,280,544 B1 | 8/2001 | Fox et al. | |
| 6,451,154 B1 | 9/2002 | Grabau et al. | |
| 6,476,775 B1 | 11/2002 | Oberle | |
| 6,520,544 B1 | 2/2003 | Mitchell et al. | |
| 6,523,734 B1 | 2/2003 | Kawai et al. | |
| 6,772,663 B2 | 8/2004 | Machamer | |
| 6,891,110 B1 | 5/2005 | Pennaz et al. | |
| 6,933,892 B2 | 8/2005 | Oberle | |
| 6,951,596 B2 | 10/2005 | Green et al. | |
| 6,951,621 B2 | 10/2005 | Hanhikorpi | |
| 6,972,394 B2 | 12/2005 | Brod et al. | |
| 7,045,186 B2 | 5/2006 | Grabau et al. | |
| 2003/0089444 A1 | 5/2003 | Melzer et al. | |
| 2004/0194876 A1 | 10/2004 | Overmeyer et al. | |
| 2004/0215350 A1 | 10/2004 | Roesner | |
| 2005/0078035 A1 | 4/2005 | Oberle | |
| 2005/0252605 A1 | 11/2005 | Green et al. | |
| 2006/0238989 A1 | 10/2006 | Manes et al. | |

* cited by examiner

*Primary Examiner* — Philip C Tucker
*Assistant Examiner* — Sing P Chan
(74) *Attorney, Agent, or Firm* — Wildman, Harrold, Allen & Dixon LLP

(57) ABSTRACT

A method and apparatus for making an RFID article such as a label, tag, ticket, envelope, carton, inlay, etc., including a microchip connected to a first antenna which is, in turn, electro-magnetically and coupled to a second antenna.

11 Claims, 11 Drawing Sheets

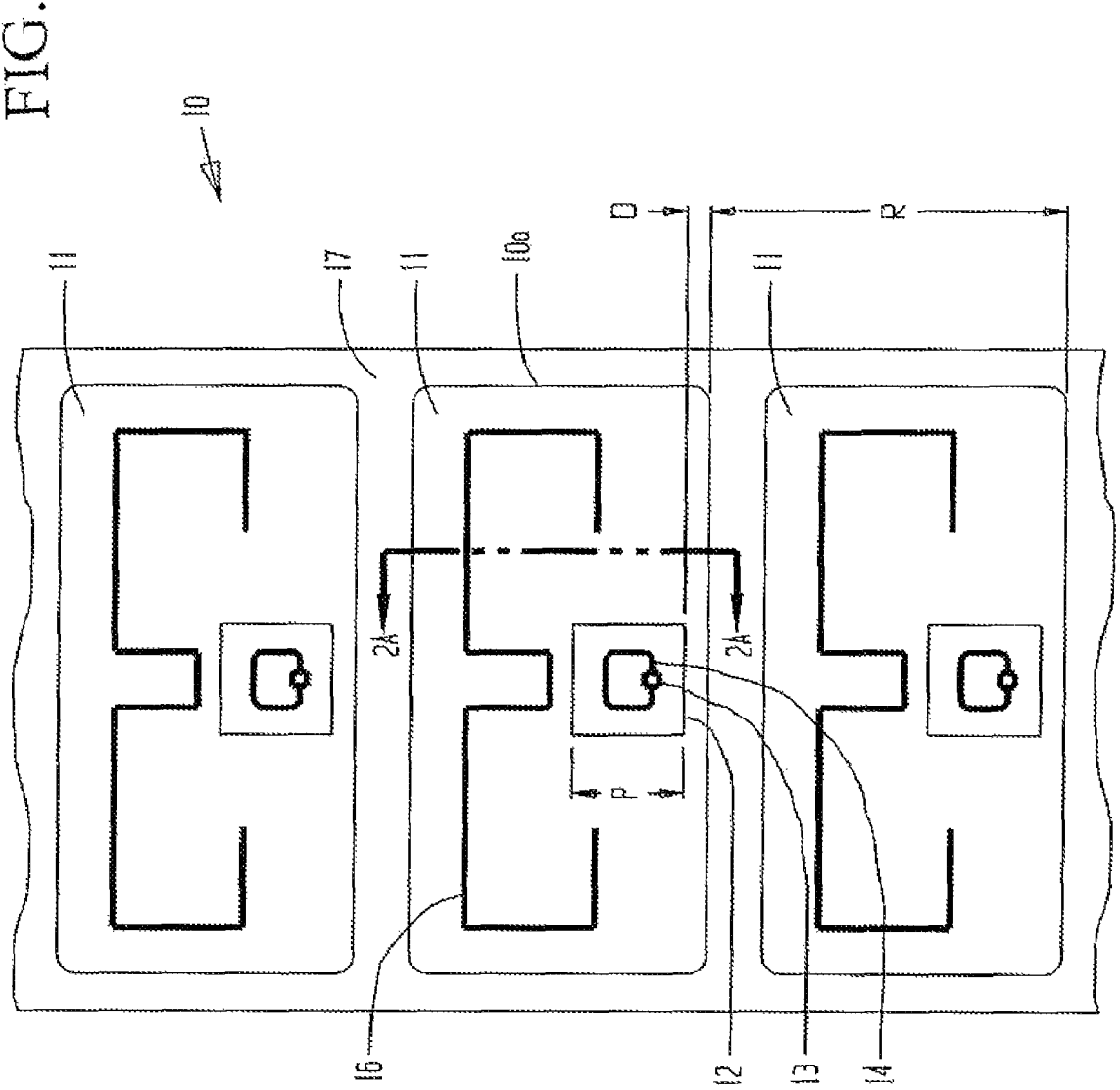

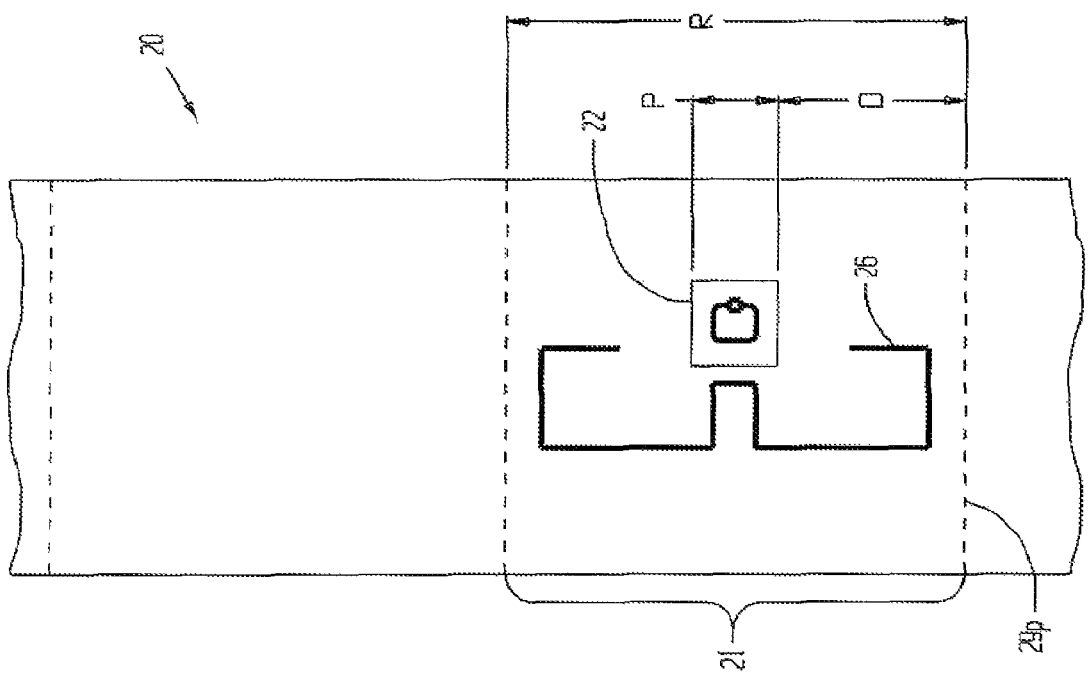

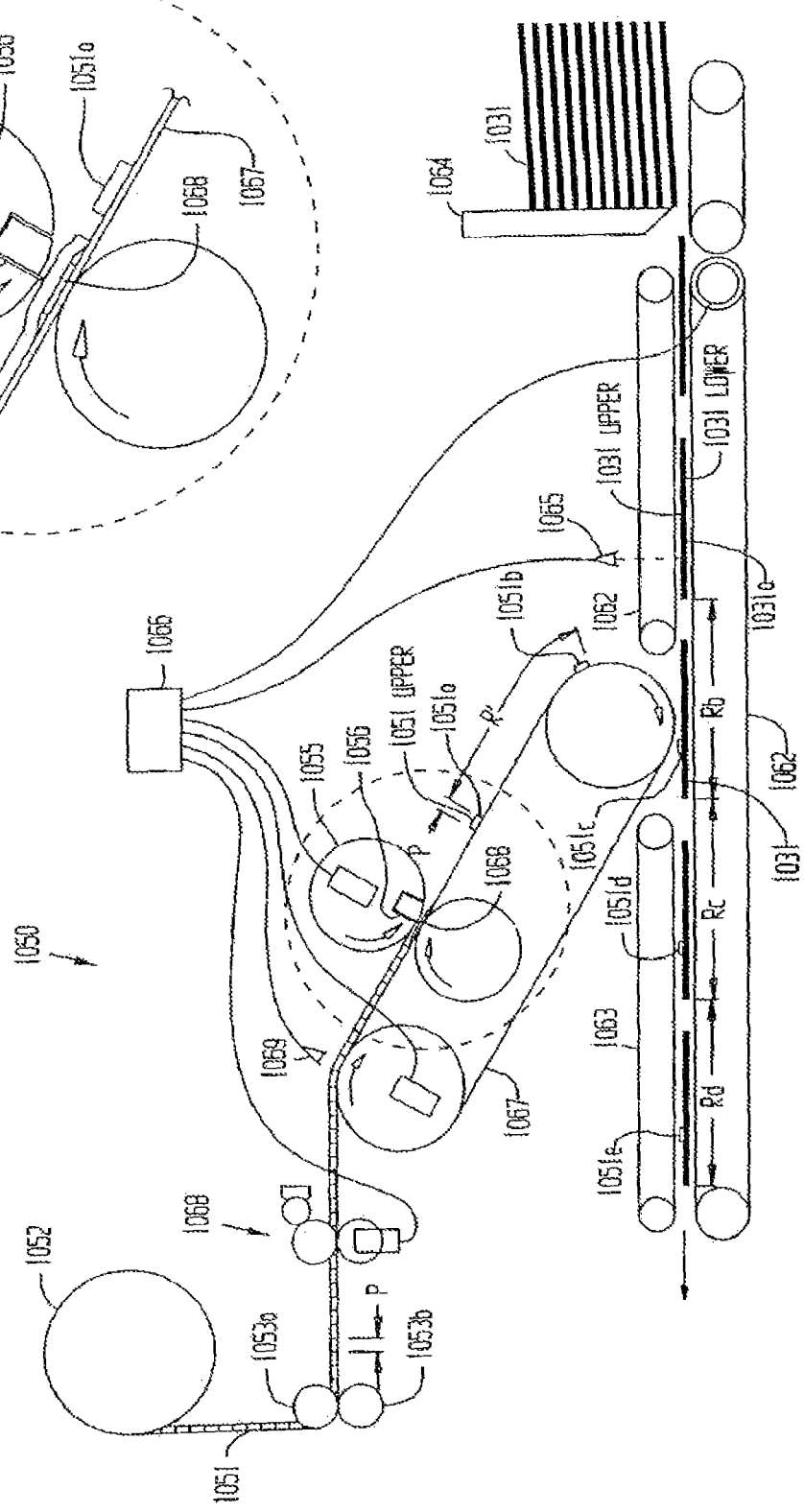

METHOD OF MAKING AN RFID ARTICLE

RELATED APPLICATION

This application claims the benefit of the filing date of co-pending U.S. Provisional Application No. 60/818,185 filed Jun. 30, 2006, entitled METHOD AND APPARATUS FOR COMBINING AN RFID ACTIVE KERNEL INLAY WITH A LABEL STOCK.

BACKGROUND OF THE INVENTION

RFID articles such as labels, tags, etc are typically equipped with a microchip electrically, i.e., conductively, capacitively and/or inductively, connected to an antenna so that the chip may be read from and/or written to via radio frequency carrier energy provided and sensed, by an interrogator or reader. RFID articles often include an RFID inlay that carries the microchip and antenna on a convenient poly or paper base layer in a 'wet' format, i.e., coated on one side with a pressure sensitive adhesive for bonding the inlay to the article, or, in a 'dry' format with no adhesive. Inlays are provided by companies such as Alien Technologies of Morgan Hill, Calif., Avery Dennison of Clinton, S.C., and TAGSYS of Cambridge, Mass. To achieve manufacturing economies of scale, inlays are typically provided in a limited number of antenna formats for general use. In some cases, a customized antenna is desirable to achieve longer range or optimize performance where the size, shape or contents of an RFID article-equipped carton affect the rf performance of the inlay.

TAGSYS of Cambridge, Mass. offers an alternative to the conventional chip/antenna inlay combination with its AK™ of Active Kernel™ technology, "Kernel" refers to a relatively small (approximately ¾" square) UHF (ultra high frequency) inlay consisting of a poly film carrying a microchip and a metallic loop antenna where the chip is conductively connected to the loop antenna. As the loop antenna is relatively small and simply shaped, the reading/writing range of the kernel inlay is relatively short, perhaps less than one foot, compared to a typical UHF inlay with a range of 3-10 feet. This "kernel" provides a "common denominator" or universal form factor inlay that may be used with a second antenna to increase reading/writing range and other performance characteristics. The kernel inlay is applied in relatively close proximity to the second antenna, but the kernel inlay typically does not touch or otherwise conductively connect to the second antenna. The kernel inlay inductively couples or resonates with the second antenna and this resonance increases reading/writing range of the combined kernel inlay and second antenna. The second antenna may be formed using a variety of known techniques, such as printing with a conductive ink, etching or grinding from a metallic layer, stamping a metallic foil, etc. and the second antenna may be carried on a variety of substrates such as paper or poly film. The structure and interaction of the kernel inlay and second antenna is disclosed in U.S. Pat. No. 6,172,608 of Cole, the disclosure of which is expressly incorporated herein in its entirety.

SUMMARY OF THE INVENTION

To date, no process has been disclosed for combining dry (no adhesive) AK inlays with secondary antennas to make RFID articles such as labels, tags or tickets.

In one embodiment, a method and apparatus is provided for making an RFID-equipped label comprising: feeding a web of uniformly spaced kernel inlays, cutting the kernel inlays in registration with their associated antennas, i.e., between spaced antennas to define a single kernel inlay, and applying the kernel inlay in a predetermined position onto a second (or "secondary") web of label stock upon which second antennas are provided in spaced relation so that the kernel inlay is located in operative electromagnetic relationship, with, but spaced from, the associated second antenna.

In alternative embodiments, the secondary antennas may be provided in a number of ways such as printing with conductive ink, chemical etching portions of metalized layer, grinding portions of a metalized layer, stamping a metallic foil, or plating. The second antenna may also be provided as another web, and cut and applied to the article in a predetermined position. Further, the second antenna may be located on the face or, alternatively, the back of the label facestock. The label facestock may be equipped with a variety of known label adhesives and known release liners, or the label may be linerless, that is, wound upon itself with no release liner.

Similarly alternative embodiments may include the kernel inlay and second antenna on the same side of the label facestock or one of the inlay and second antenna on the front and the other on the back of the label facestock.

Other RFID articles may be produced with the method, such as event or transit tickets, which typically do not include an adhesive for adhering the article to another item. In the case of tickets, there may be a front and back layer with the kernel inlay and second antenna therebetween or with the kernel inlay applied to a separate surface from the second antenna.

Applicator apparatus adaptable for feeding cutting and applying kernel inlays is disclosed in U.S. Pat. No. 6,207,001 of Steidinger et al and PCT Application No. PCT/US2006/015986 of Steidinger et al, the disclosures of which are incorporated herein in their entirety.

Another RFID article produced with the method may be folding cartons where the cartons may be in a web format or as a stream of individual cartons. The kernel inlays and secondary antennas may be applied to the inside or outside surface of the carton, or the kernel inlay on one side of the carton and the second antenna on the other.

Applicator apparatus adaptable for applying kernel inlays of the inventive method to a predetermined location on a stream of individual cartons is disclosed in U.S. Pat. No. 6,772,663 of Machamer, the disclosure of which is incorporated herein in its entirety.

BRIEF DESCRIPTION OF THE DRAWINGS

FIG. 1 is a top view of one embodiment of a RFID label web with at least one kernel inlay and second antenna;

FIG. 3 is a top view of a RFID tag web with at least one kernel inlay and an associated second antenna;

FIG. 10 is a front schematic view of apparatus including a vacuum belt subsystem for feeding, cutting and applying kernel inlays or secondary antennas to make RFID cartons; and FIG. 11 is a close up view of the cutting apparatus shown in FIG. 10.

DETAILED DESCRIPTION OF THE INVENTION

Figure 2A:
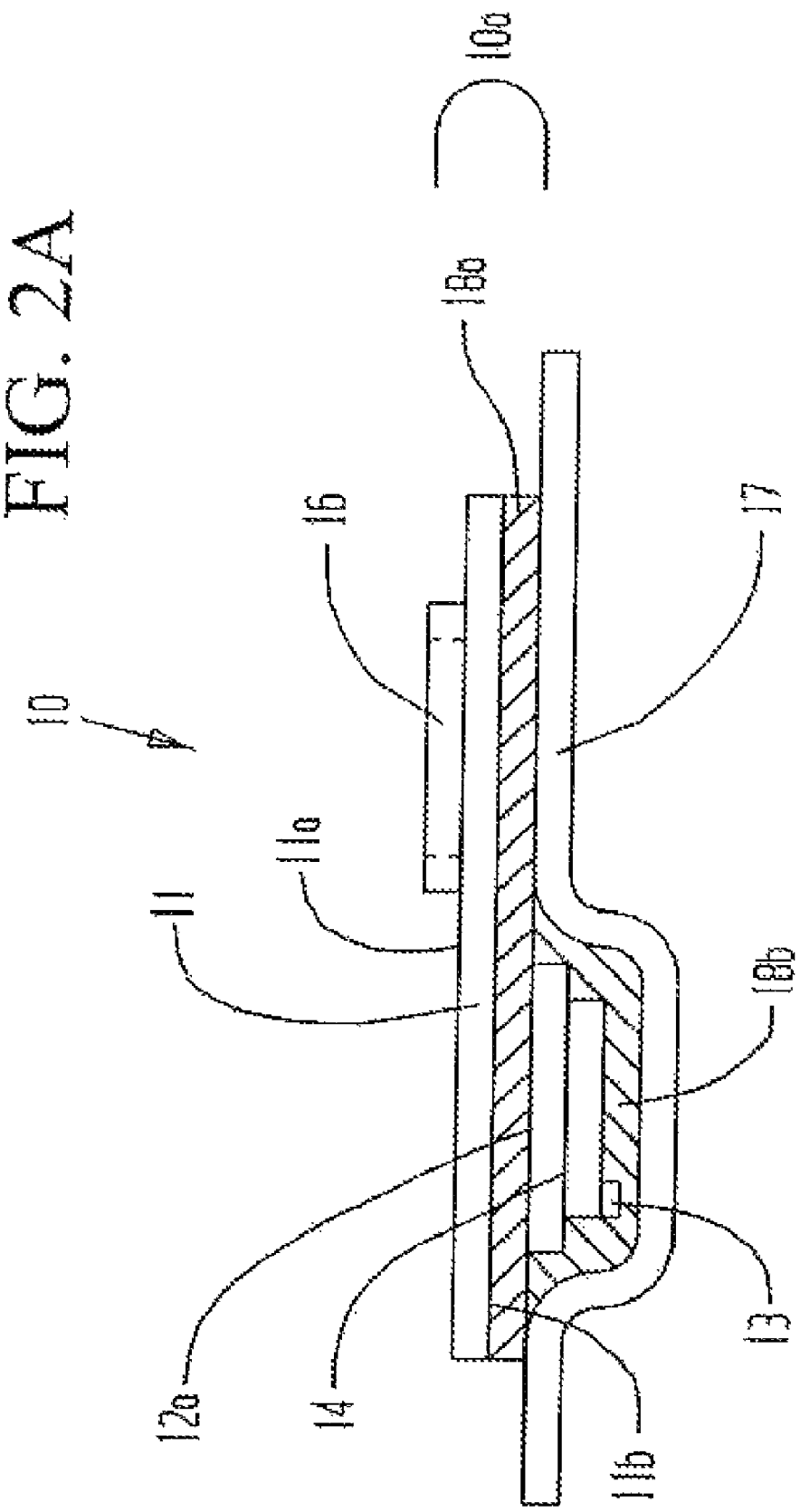
FIG. 2A is a cross section view of one RFID label taken through sight line A-A of FIG. 1.

FIG. 1 shows a lop view of a portion of a web 10 of RFID labels 11. At least one of the labels 11 is equipped with a kernel inlay 12 which includes a typically dielectric substrate 12a (See FIG. 2A), and a microchip 13 electrically connected with an antenna 14. The label 11 is typically equipped with an adhesive 18a (FIG. 2A) such as a pressure sensitive adhesive. A second antenna 16 is also attached to label 11. The second antenna 16 may be on the same side of the label 11 as the kernel inlay 12. The second antenna 16 may also be on the opposite side of the label 11 from the kernel inlay 12, if desired. Similarly, the kernel inlay 12 may be placed on either side of the label facestock 11. Kernel inlay 12 may also overlie second antenna 16 so long as kernel inlay antenna 14 is separated or insulated from second antenna 16 by the kernel inlay substrate 12 and/or label facestock 11.

Label construction or web 10 may also include a release liner 17 and an adhesive 18a selected from known pressure sensitive adhesive, remoistenable, heat-activated or other known adhesives. The kernel inlay substrate 12a may be adhered to the label 11 via the adjacent portion of adhesive 18a. The portion of adhesive 18a covered by kernel inlay substrate 12a is not available to adhere the label 11 to a subsequent article such as a package, envelop or other product. The covered portion of adhesive 18a may be supplemented by an adhesive pattern 18b. Adhesive pattern 18b may be the same size, larger, or smaller than the inlay substrate 12a, as desired, and secures the inlay.

In some cases, the release liner 17 may be omitted if the upper surface 11a of the label facestock 11, the adhesive 18a, and if used, adhesive 18b are selected to allow the label web 10 to be wound, rolled, or coiled upon itself, in a construction known as a linerless label. In the case of the linerless label, the roll of labels may be unwound as the surface 11a of the label 11 has less affinity for the adhesive 18 than the surface 11b.

The drawings are not to scale, particularly in that the thicknesses of the components may be exaggerated for clarity and in actual practice are much thinner so that the 'bump' created by the stack-up of the kernel inlay 12, components 12a, 13, and 14 plus adhesive 18b, if used, is also much thinner and less noticeable than illustrated.

Turning to FIG. 1, the kernel inlay 12 has a longitudinal dimension (i.e., in the direction of web elongation or movement) or pitch P (FIG. 1) and the labels 11 have a repeat R on the label stock 10. The kernel inlay 12 is typically placed in a predetermined position on label 11. The location of inlay 12 in the longitudinal dimension relative to a predetermined location on the label is denoted as D (FIG. 1). These dimensions, D, P and R, will be further described and related herein.

While not shown, kernel inlay 12 may alternatively be adhered to the label facestock upper surface 11a (FIG. 1). In this case the inlay may be equipped with a pre-applied or in-situ applied adhesive, such as pressure-sensitive adhesive, to secure it to the facestock.

FIG. 3 illustrates a web 20 of tags or tickets 21. Each ticket 21 is delineated by a perforation 29p, score, or the like so the tickets may be separated at some point for use. At least one ticket 21 is equipped with a kernel inlay 22 having a kernel substrate 22a, a microchip 23 electrically attached to an antenna 24 (see FIG. 4). The kernel inlay may be attached to ticket 21, for example, with an adhesive 25 that may be pre-applied to the inlay or applied in situ to either the kernel inlay substrate 22a or ticket substrate upper laminate 29. The ticket 21 includes a second antenna 26 which may be provided in a variety of known ways, some of which are mentioned above.

Similar to the label construction, the kernel inlay 22 of the ticket embodiment has a pitch P (along the longitudinal length of the article) and is typically located in a predetermined position on a ticket with a longitudinal dimension between leading or corresponding edges on adjacent articles, or "repeat" denoted R. In the longitudinal dimension, the predetermined position is denoted as D in FIG. 5 for cartons.

Figure 4:
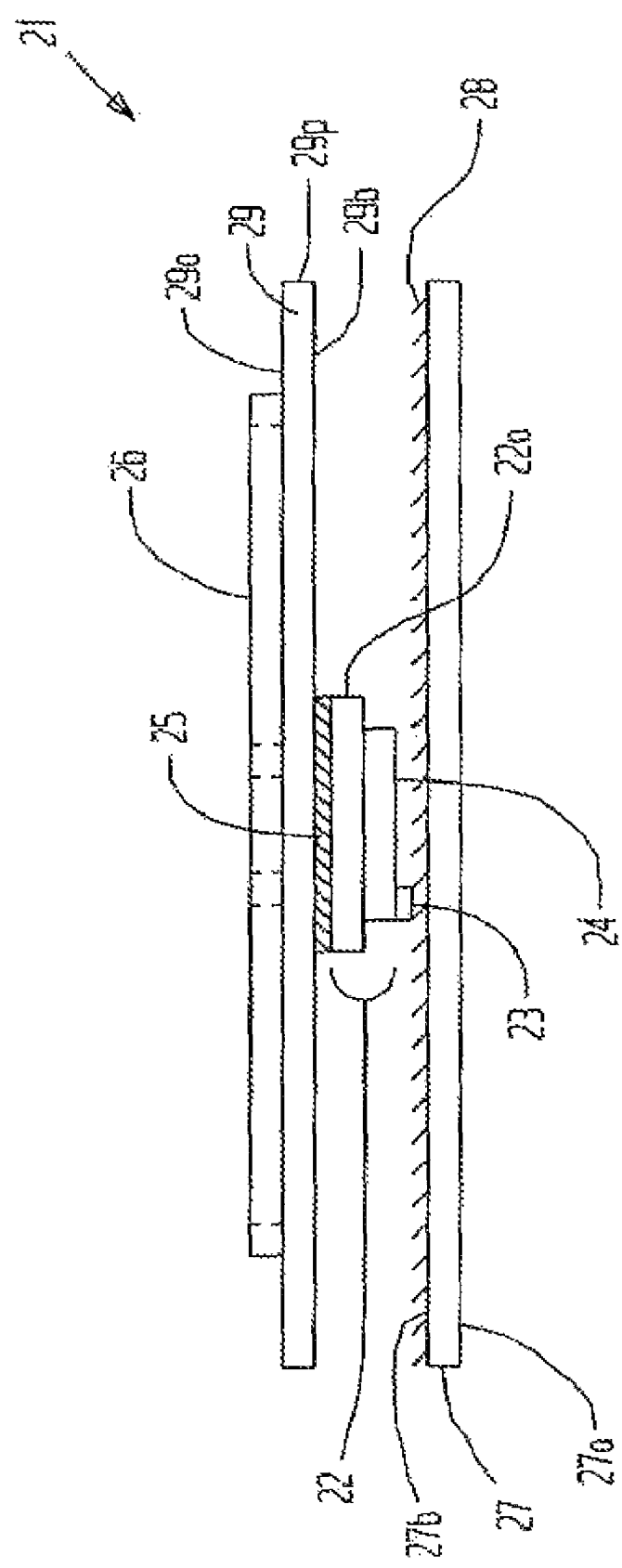
FIG. 4 is a cross section view of one RFID tag taken through sight line 4-4 of FIG. 3.

FIG. 4 shows a cross sectional view of the tag or ticket 21 of FIG. 3. The ticket may have upper and lower laminates 29, 27 with the kernel inlay 22 therebetween. Alternatively, kernel inlay 22 may be placed on outer surfaces 27a or 29a of ticket 21.

The second antenna 26 is shown on the outer surface 29a but may alternatively be placed on surfaces 27a, 27b, or 29b. An adhesive 28 such as pressure sensitive adhesive, remoistenable adhesive, hot melt adhesive, heat activated or other known adhesive or bonding technique may be used to bond upper and lower laminates 29, 27 together. As an alternative embodiment, one of the laminates 27, 29 may cover only a portion of the other. As a further alternative, one of the layers 27 or 29 may be deleted, with kernel inlay 22 and second antenna 26 located on the remaining layer.

Figure 5:
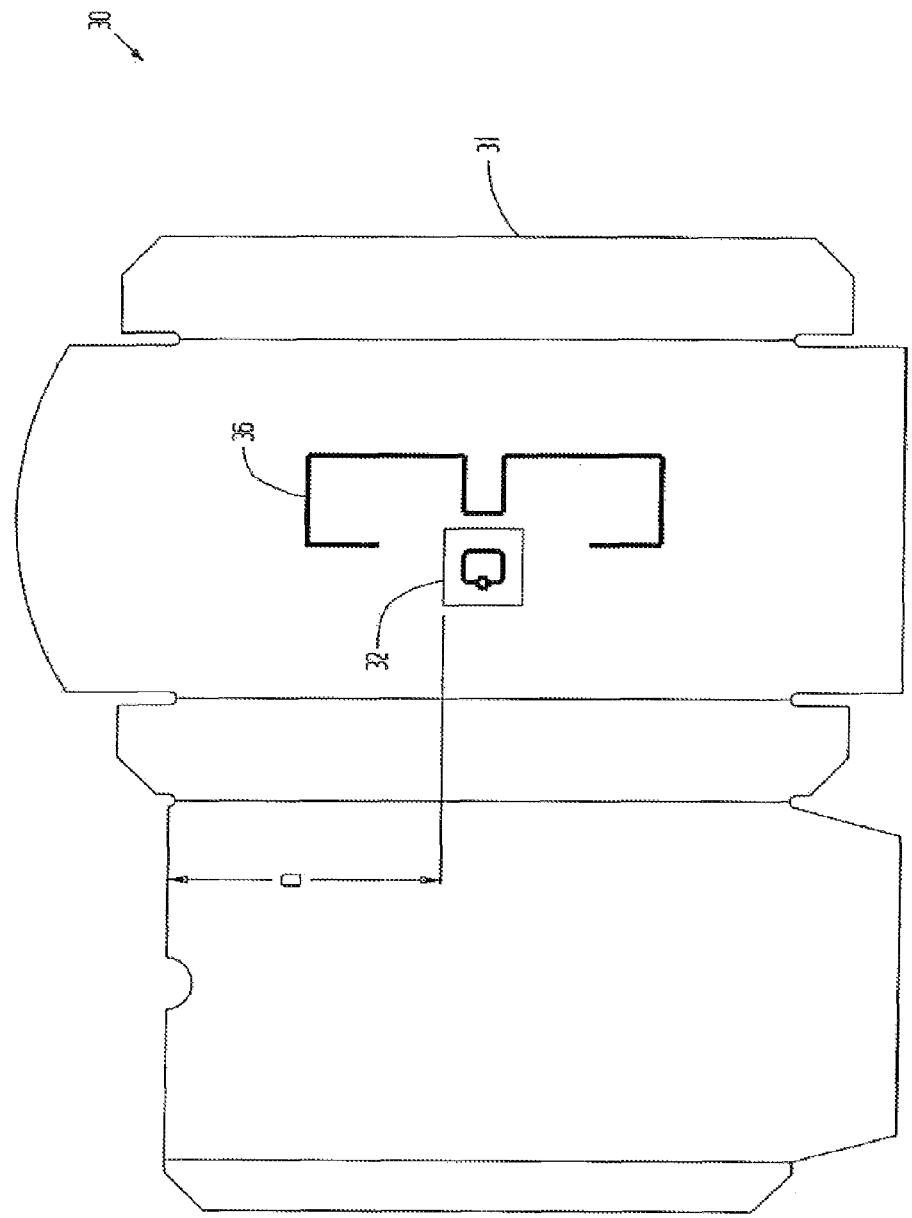
FIG. 5 is a top view of an RFID carton with a kernel inlay and second antenna.

FIG. 5 illustrates a further article, an RFID enabled carton 30, including a carton blank 31 often made of approx. 0.008" thick paper carton board, stiff poly materials, e-flute, or other known materials or composites. A kernel inlay 32 is attached to either surface of the carton blank 31. A second antenna 36 may be provided in conventional ways described herein on either side of the carton blank 31. The carton blank may be folded and glued in known ways using a carton folder-gluer such as that manufactured by Bobst S A of Lausanne, Switzerland to form a useful carton for containing products such as playing cards, foods, sporting goods, pharmaceuticals and many more. Again, the kernel inlay 32 is typically located in a predetermined position on the carton blank. This is denoted D in FIG. 5 in the typical carton processing longitudinal direction.

Figure 6:
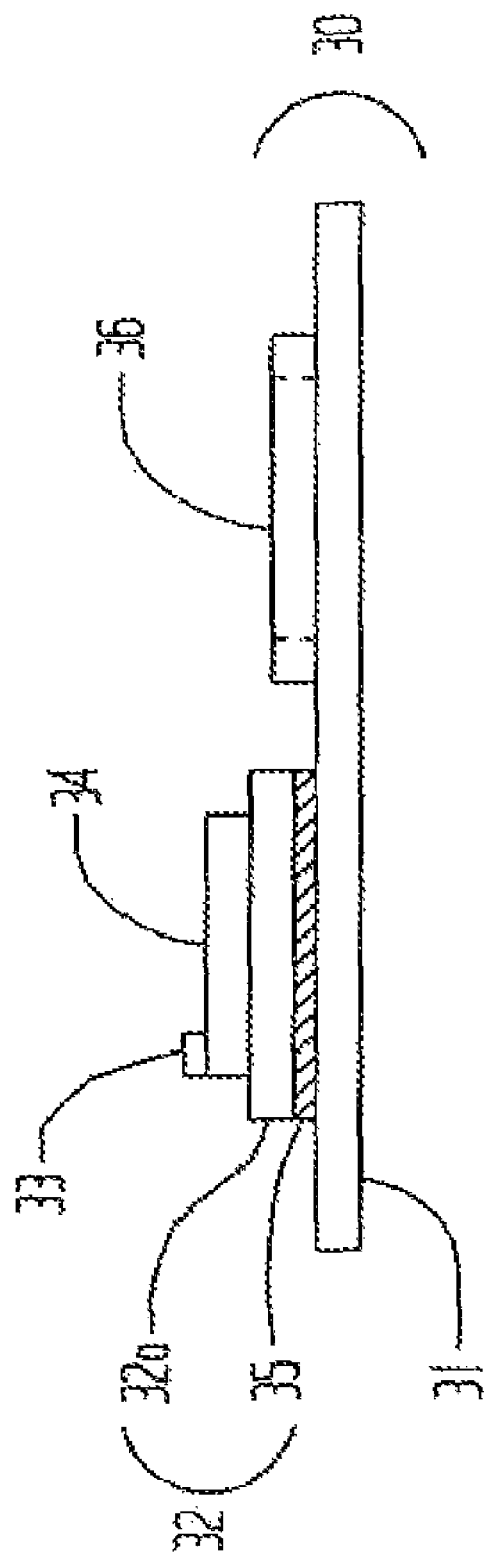
FIG. 6 is a cross section view of the RFID carton taken through sight line 6-6 of FIG. 5.

FIG. 6 is a cross section view of RFID-equipped carton 30. The kernel inlay 32 and second antenna 36 are shown on the upper surface of carton blank 31 but may alternatively be on the lower surface, or one on the upper and the other on the lower surface of carton blank 31. The kernel inlay 32 may be covered with a protective laminate (not shown), so that it is protected during the steps of folding-gluing, filling with product, or general use, as to protect the microchip 33 and its bond to antenna 34.

Figure 7:
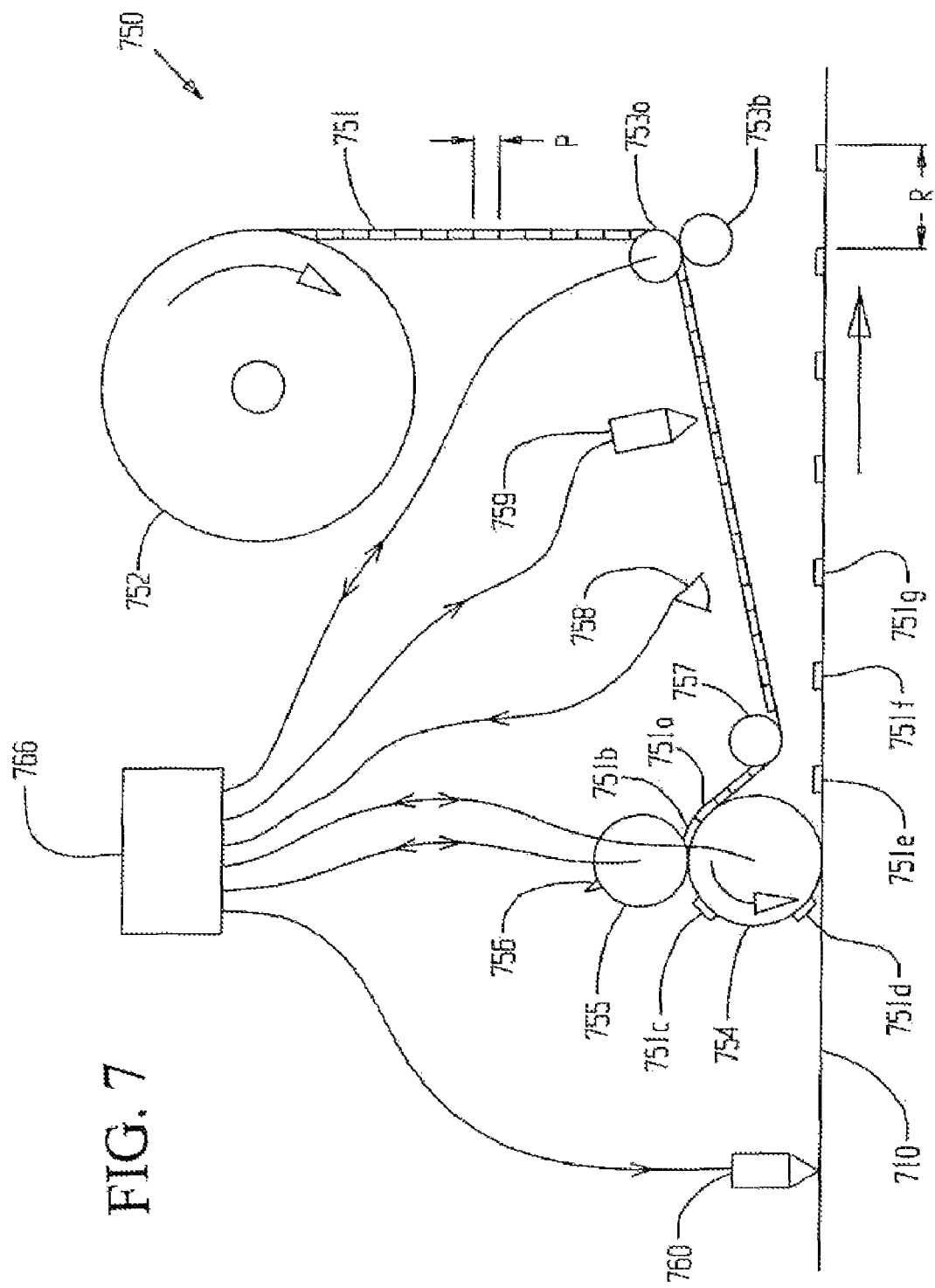
FIG. 7 is a front, schematic view of vacuum cylinder applicator apparatus for feeding, cutting, and applying kernel inlays or second antennas to a web.

A schematic front view of a basic feed/cut/vacuum applicator apparatus 750 is shown in FIG. 7. One disclosure of a basic feed/cut vacuum applicator, or 'vacuum applicator' is found in U.S. Pat. No. 2,990,081 of DeNeui et al. Commercially available vacuum applicators have been used to feed, cut and apply various materials such as tapes, laminates, labels, release liners, thin window films, foils, carbon papers, and many others. In more recent years, vacuum applicators have been used to apply RFID inlays and RFID straps. An RFID strap is a relatively small device (about 3 mm×5 mm) consisting of a microchip and connecting pads on a paper or film substrate (i.e. without an antenna).

Figure 2B:
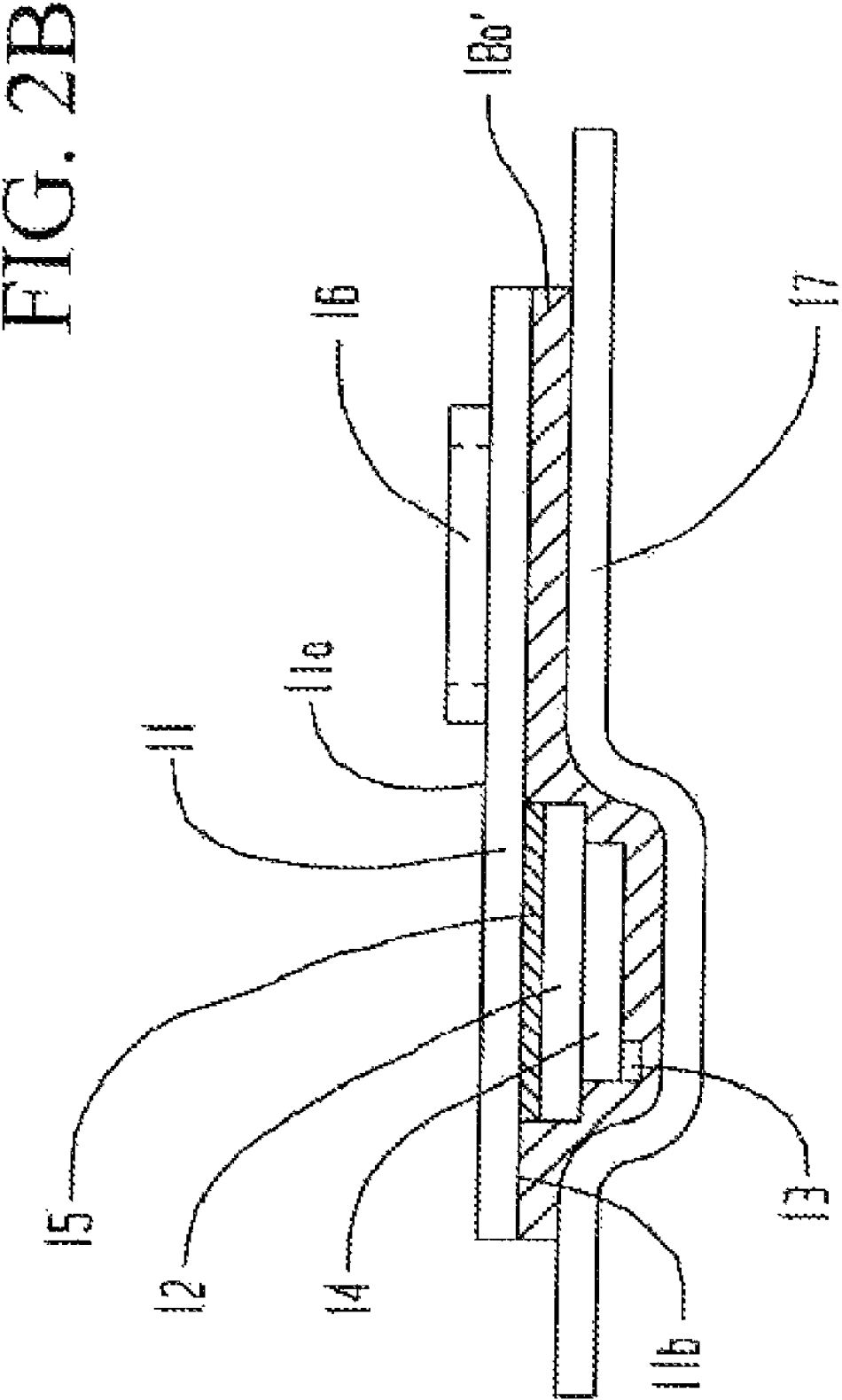
FIG. 2B is a cross section view of an alternate embodiment of an RFID label taken through sight line A-A of FIG. 1 resulting from an alternative assembly process.

In FIG. 7, the material to be cut and applied is in the form of a web 751 of kernel inlays 751a-751g (in FIGS. 1 and 2 at 12; in FIGS. 3 and 4 at 22; in FIGS. 5 and 6 at 30) wound into a source roll 752. Each inlay 751a, etc, has a web direction length or pitch, P. The web 751 is friction fed by gripping between feed rollers 753a and 753b or alternatively via sprocket holes (not shown) in web 751 and corresponding cogs or teeth on one of the feed rollers 753a, 753b. At least one of rollers 753a and 753b is driven by a servomotor and gearbox such as provided by Bosch Indramat of Lohr am Main, Germany and others. The servomotor's interface and control will be described briefly herein and in any event have been more fully disclosed in U.S. application Ser. No. 60/674, 439, which is expressly incorporated herein.

Web 751 proceeds to vacuum cylinder 754 via an idler roller 757 which deflects web 751 in an advantageous wrap on the vacuum cylinder 754 so that vacuum supplied to the surface of vacuum cylinder 754 in a variety of known ways may act on web 751, thereby holding web 751 onto the outer surface of vacuum cylinder 754. Idler roller 757 may be deleted if positions of feed rollers 753a,b and vacuum cylinder 754 are adjusted or relocated to similarly feed web 751 onto vacuum cylinder 754. Cutting cylinder 755 is equipped with at least one blade 756 and cooperates with vacuum cylinder 754 to sever one kernel inlay, such as 751c from web 751. The separated kernel inlays are secured to the surface of vacuum cylinder 754 by applied vacuum and move at the surface speed of the vacuum cylinder until released and applied to carrier web 710, as at 751d,e, etc. Vacuum cylinder 754 may be hardened to provide a suitable, long wearing anvil surface for blade 756 to cut against. Vacuum cylinder 754 may be mechanically driven using gears, pulleys driveshafts, etc. from a host machine, such as a flexographic printing press supplied by Mark Andy of Chesterfield, St. Louis. The host machine, conveys carrier web 710 in a manner that controls web tension, speed, and position.

Cutting cylinder 755 may foe mechanically driven by vacuum cylinder 754 using gears, for example, or from the host machine using known methods so that one kernel inlay 751c, etc, of pitch P is cut and then applied for every label or ticket repeat R of the carrier web 710. Kernel inlay 751e, for example may be applied at a predetermined location on web 710, for example so the inlay may fee positioned a distance D from a feature on the label, ticket, tag or carton as shown in FIGS. 1, 3, and 5.

Alternatively, one or both of the vacuum cylinder 754 and cutting cylinder 755, may be servo driven via a servo control system where the feed rollers 753a or 753b, vacuum, and cutting cylinders are controlled by and communicate with an Indramat PPC servo controller 766 via fiber optics and SERCOS protocol and operate according to Visual Motion programs. The system operator may interface with the servo control system via a UniOP Exor touchscreen provided by SITEK S.p.A. of San Giovanni Lupatoto V R, Italy. Servo control system also includes an input from an optical scanner 758 such as supplied by Keyence Corporation of USA of Woodcliff Lake, N.J. This allows coordination of the feed rollers 753a,b and cutting cylinder 755 so that blade 756 cuts inlay web 751 between adjoining antennas 24 thus delivering a cut kernel inlay 751c, etc, (12, 22, 32 as illustrated in FIGS. 1, 3, and 5).

Typically, dimensions D, P, and R remain constant through a given production run. Any of dimensions D, P, R may, however, intentionally vary during the course of a job. For example, placing inlays at alternating locations on a label, where the label is placed in an otherwise constant location on a stack of closely spaced items such as envelopes, allows more reliable reading of the inlays. U.S. Pat. No. 5,766,406 of Brod disclosed dynamically or cyclically varying the speeds of the servo drives to feeding, cutting, and vacuum axes to intentionally vary dimensions D, P, and/or R from article to article and the disclosure thereof is incorporated here in its entirety.

Adhesive may be required to adhere kernel inlays to a substrate, particularly the tag or ticket laminations 27 or 29 of FIG. 4. The adhesive 25, which may be of various known adhesives including pressure sensitive adhesive, may be pre-applied or applied in situ with applicators such as extrusion or roller applicators shown schematically at alternate locations 759 or 760 in FIG. 7. Applicator at 759 may apply a continuous coating of adhesive, while the applicator at 760 may apply a continuous or pattern coating. Timing and duration of a pattern coating may be effectively controlled via the Indramat PPC servo controller 766 disclosed herein and in application 60/674,439.

Figure 8:
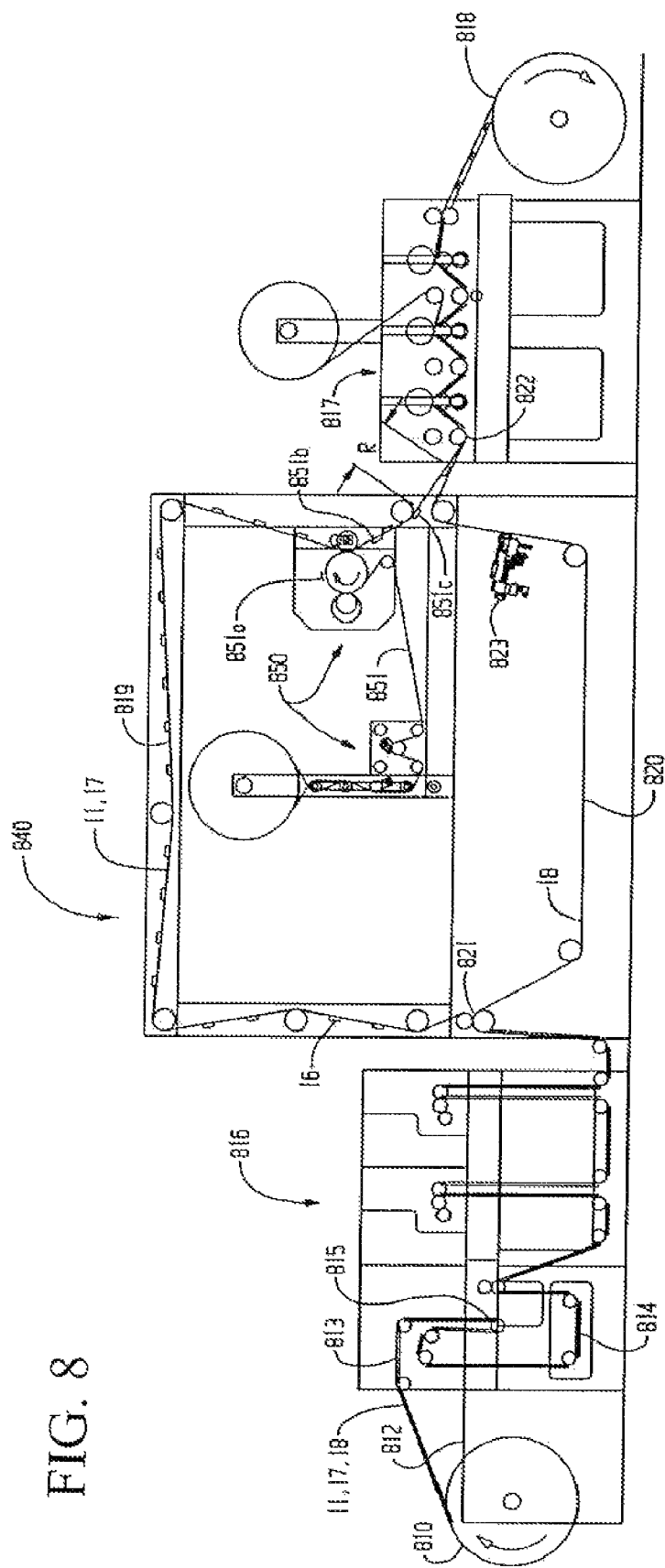
FIG. 8 is a front schematic view of apparatus, including the applicator of FIG. 7, for making a web of RFID labels.

Vacuum cylinder applicator 750 may be installed in and coordinated with a web transport system 840 (FIG. 8) to make RFID articles such as webs of labels 10 of FIG. 1, tags or tickets 20 of FIG. 3.

In the case of label web 10 (FIGS. 1 and 2), a roll of labelstock 810 which may include label facestock 11, release liner 17 and adhesive 18a, may be unwound in a known unwind stand 812, with splicing table 813, web guide 814 and tension control 815. The web may be printed with graphics and/or second antennas 16 in print station 816, typically on upper surface 11a. The label facestock 11 with adhesive 18a may be separated from release liner 17 in a delamination station 821. The facestock 11 and adhesive 18a follow the web path 819. Kernel inlay 851a, is cut from inlay web 851 and applied to the adhesive 18a on label facestock 11 at a repeat R via applicator 750. Note that the kernel inlay 851a covers a portion of the label adhesive 18a on the facestock 11. When label 10a (FIGS. 1 and 2) is removed from liner 17, This results in a 'dry spot' or area lacking adhesive for fully adhering the label 10a onto an article to be labeled. If desired, the portion of adhesive 18a covered by the kernel inlay 851a, may be 'replaced' by adding a corresponding area of adhesive 18b (FIG. 2A) to release liner 17 via an adhesive applicator 823 such as the Apex™ pattern adhesive applicator provided by ITW Dynatec of Hendersonville, Tenn. This applicator may be controlled, by processor 766 (FIG. 7) to deliver the adhesive area in register with the eventual position of kernel inlays 851a,b, etc.

The label facestock 11, with adhesive 18a and kernel inlays 851a,b, are relaminated with release liner 17 at relamination station 822 in press finishing section 817 where the label web 10 of FIG. 1 may be die cut, matrix-removed, read, cut, perforated, folded, sheeted or rewound in known ways. In this embodiment, the second antenna 16 is on the opposite surface of label facestock 11 from kernel inlay, 12 as shown in FIG. 1.

Figure 9:
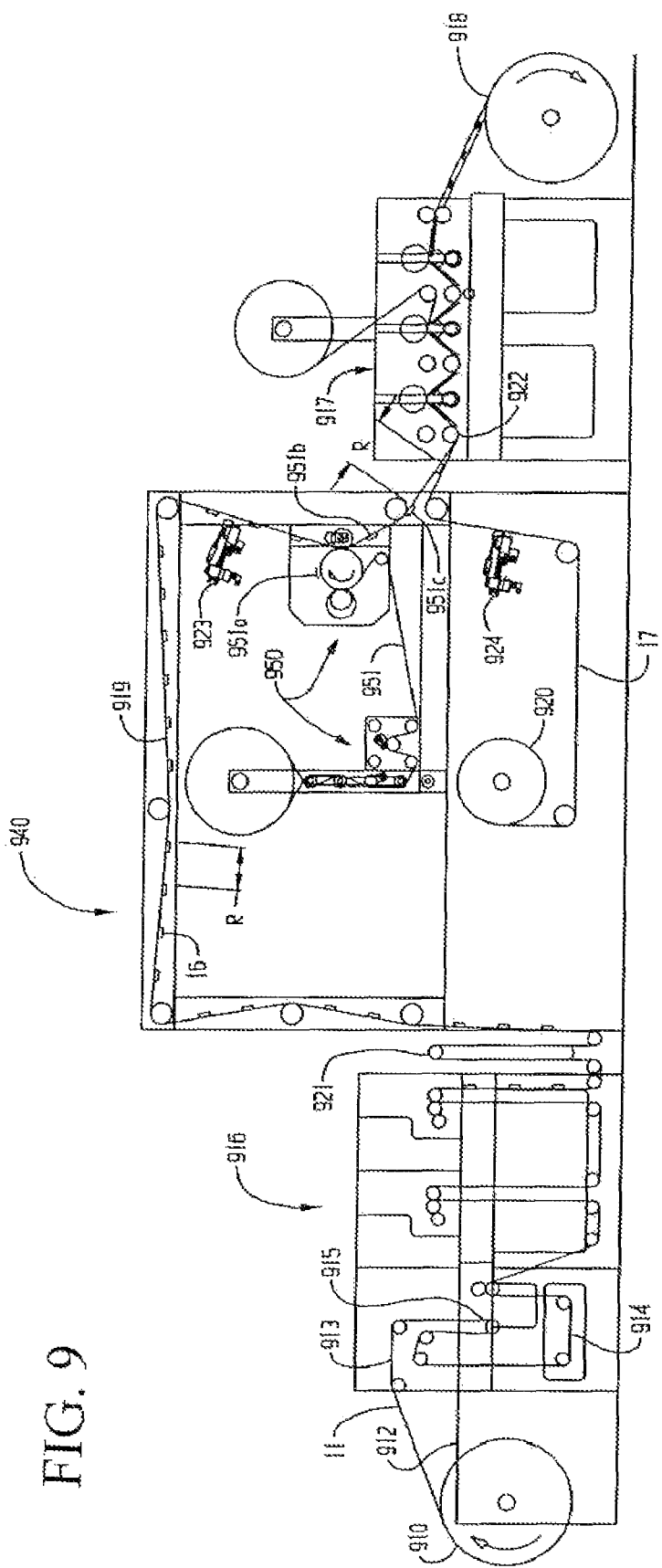
FIG. 9 is a front schematic view of apparatus, including the applicator of FIG. 7, for making a web of RFID labels, tags, tickets, or cartons.

In alternative embodiments, the second antenna 16 may be on the same side of label facestock 11 as kernel inlay 12 with the processing apparatus 940 reconfigured as shown in FIG. 9. In these embodiments, a web of label facestock 11, only, i.e. without adhesive 18a and liner 17, is unwound from roll 910. The facestock web 11 is printed with graphics if desired, and second antennas 16, typically at a repeat R or some multiple thereof in the case where all labels 11 do not receive an antenna. The facestock web 11 is turned over with turn bar module 921 thus secondary antennas 16 are on the underside of web path 919 and kernel inlays 951a, b, c are applied to the same side of facestock web 11 as secondary antennas 16 and also at a repeat R corresponding to the secondary antennas 16 and at a predetermined position D (FIG. 1). Kernel inlays 951a,b,c may be adhered to facestock 11 via an adhesive 15 (FIG. 2B), either pre-applied (a combination often referred to as a 'wet' inlay) or applied in situ via adhesive applicator 923. Further, in the case of a 'wet' inlay the kernel inlays 12 may be peeled from a release liner carrier (not shown) by a known peel bar device (not shown) that takes the place of the cutting cylinder 755 and cutting blade 756 and acting in cooperation with vacuum cylinder 754 in the applicator 750 of FIG. 7.

Release liner 17 is supplied from roll 920 (FIG. 9) and adhesive 18a (FIG. 2AB) is provided from applicator 924. Alternatively, roll 920 may be a transfer tape that includes both liner 18 and adhesive 17, in which case applicator 923 would not be needed.

The facestock 11 including secondary antennas 16 and kernel inlays 951a,b,c are laminated with release liner 17 and adhesive 18a' at lamination station 922 and further processed as previously disclosed.

In the case of a tag or ticket construction of FIGS. 3 and 4, The apparatus of FIG. 9 may also be used. In the case of tags or tickets, the upper laminate 29 (FIG. 4) is supplied from roll 910 and the lower laminate 27 (FIG. 4) is provided from roll 920 which is a paper or poly ticket laminate instead of release liner. In alternative embodiments, the kernel inlay 951a may be on the same or opposite sides of top web 29.

In an alternative embodiment, not shown, secondary antenna 16 rather than being printed directly on a surface of facestock 11, may instead be supplied on a separate web, similar to the kernel inlay web 951. The secondary antennas could then be fed, cut and applied by an additional applicator (not shown) and applied to facestock web 11 in a predetermined position to allow function and interaction with kernel inlays. This may be advantageous where secondary antennas are produced by methods less compatible with the printing press-based web handling device shown in FIGS. 8 and 9, such as when the secondary antennas are formed by chemical etching or plating process. In such cases, it may be advantageous to prepare the secondary antennas in advance, in a separate process, and then combine them with kernel inlays. The combination may be accomplished in two passes through a system 940 with one applicator 950 (as shown) or in one pass in a system with two applicators (not shown).

Another kind of vacuum applicator is described in U.S. Pat. No. 6,772,663 of Machamer. This vacuum applicator was originally developed to apply thin film windows to folding cartons where the folding cartons are discrete pieces carried at varying repeats, R, on earner bells such as in a folding-gluing machine. This vacuum applicator has feed roller(s) and cutting cylinder much like the vacuum cylinder applicator, but the vacuum cylinder has been replaced by one or more vacuum belt assemblies. The instant invention may employ such methods and apparatus.

A basic vacuum belt applicator 1050 installed on a host machine such as a carton folder-gluer that feeds carton blanks 1031 onto carrier belts 1062. Carrier belts 1062 are driven and cooperate with upper belts 1063 which hold carton blanks 1031 against driven carrier belts 1062 causing the carton blanks 1031 to be moved in the direction of the arrow at a speed essentially matching the speed of the driven belts 1062. The hopper feeder 1064 feeds carton blanks 1031 onto carrier belts 1062, at slower speed than carrier belts 1062 with a resulting gap between carton blanks 1031 on carrier belts 8102. The carton blanks 1031 thus feed at a nominal pitch or repeat R which may vary somewhat due to inconsistencies in feeding at hopper feeder 1064. The vacuum belt applicator 1050 can react to variations in repeat R by scanning the position of a lead or trail edge of a carton blank 1031 using an optical scanner 1065. Scanner 1065 sends an input to servo controller 1066 which controls the speed and timing of several servo motors which drive at least one of the feed rollers 1053a, b, and the cutting cylinder 1055. In this case the servo drives for at least one of feed cylinders 1053a, 1053b and cutting cylinder 1055 rotate the rollers intermittently in response to the carton edge sensed by scanner 1065. The vacuum, belts are also servo-driven and controlled so that the speed of the vacuum belt(s) 1067 essentially matches the continuous speed of the carrier belts 1062.

According to the invention, when practiced using the type of equipment described herein, a web of kernel inlays 1051 is unwound from a roll of kernel inlays 1052 by the feeding action of feed rollers 1053a,b. The web 1051 proceeds onto vacuum belts 1061 and is cut by blade 1056 of rotating cutting cylinder 1055 contacting anvil surface 1068 which rides on vacuum belt (s) 1067.

Referring to FIG. 11, the web 1051 is cut to a length P corresponding to the pitch of the kernel inlays and the cut is positioned between antenna patterns by means of input from optical scanner 1069 to a conventional servo controller 1066 and coordination of servo driven feeding roller, one of 1053a or 1053b, and cutting cylinder 1055.

Once the web of kernel inlays 1051 is cut, the cut inlay 1051a accelerates to the surface speed of the vacuum belt(s) 1067 and is conveyed toward the predetermined position on a particular folding carton blank 1031a which is sensed by scanner 1065 and thereby located by servo controller 1066. In a similar manner, inlay 1051b is already en route to placement on the desired position on carton blank 1031b which was scanned by scanner 1065 at a repeat Rb. The desired position of inlay 1051a, 1051b on cartons 1031a, 1031b may be in relation to a physical feature on carton blank such as an edge of a carton blank or an antenna on the carton blank. The antenna may be pre-printed on the carton blank 1031 and may be on the upper surface 1031 upper or lower surface 1031 lower. As previously mentioned, the RFID article may be constructed with the kernel inlay 1051a on the same surface as, or on an opposite surface from, the second antenna. The surface 1031 upper generally becomes the inner surface of a finished carton and the location of kernel, inlay 1051a on an inner surface of the carton may be chosen to allow protection from damaging external forces, impacts, peeling, tampering, etc. or to obscure the kernel inlay from view. Similarly, the secondary antenna may be protected on the inside of the carton. Or the antenna may be displayed on the outside as an overt feature, or to separate the secondary antenna from the eventual contents of the carton, possibly enhancing antenna performance by separating it slightly from metallic contents, for example.

Kernel inlay 1051a, 1051b may be adhered to its respective carton blank 1031a, 1031b by adding an adhesive to the upper surface, 1031 upper, by means of an adhesive applicator 1068, illustrated schematically as a roller type where the rollers may also be servo driven and controlled by controller 1066 to coordinate its application of adhesive in register with the intermittent motion of web 1051. Adhesive applicator may also be an extrusion type such as supplied by ITW Dynatec of Hendersonville, Tenn. which may also be controlled by processor 1066 to apply adhesive intermittently or continuously onto web 1051.

In the case of 'wet' kernel inlays, the inlays 1051a, 1051b may be supplied such as pressure sensitive labels on a release liner. A conventional peel mechanism peels individual kernel inlays 1051a, 1051b from the liner and dispenses them onto the vacuum belt, as a functional alternative to the cutting operation of cutting cylinder 1055 and blade 1056. In this embodiment the adhesive of the 'wet' inlay would be exposed on kernel inlay upper surface 1051. When kernel inlay 1051*a* is applied to a carton blank 1031*a* in the predetermined position, the exposed adhesive adheres the kernel inlay to the carton blank 1031*a*.

Having thus disclosed in detail an embodiment of the invention, persons skilled in the art will be able to modify the structure illustrated and substitute equivalent elements for those disclosed; and it is, therefore, intended that all such substitutions and equivalents be covered as they are embraced within the scope of the appended claims.

The invention claimed is:

1. In an in-line method of making an RFID article, the steps comprising:
    conveying a first web having a plurality of kernel inlays carried on a surface of the first web, each kernel inlay including an electronic chip electrically coupled to a first antenna;
    conveying a carrier web having a plurality of second antennas spaced longitudinally on a first surface of the carrier web;
    dividing the first web into individual sections each including a kernel inlay;
    thereafter applying the divided sections of said first web each having a respective kernel inlay thereon to the carrier web in predetermined positions relative to, and in operative electromagnetic communication with an associated one of the second antennas, wherein each kernel inlay is disposed on the first surface of said carrier web in an offset manner from an associated second antenna.

2. The method of claim 1 wherein said kernel inlays are spaced apart uniformly on the surface of the first web.

3. The method of claim 2 wherein the carrier web is a tagstock.

4. The method of claim 2 wherein the carrier web is a tagstock and further comprising the step of applying a laminating layer to cover the kernel inlays and second antennas.

5. The method of claim 2 wherein the carrier web is label face stock and further comprising the step of continuously applying adhesive-coated liner to the label face stock to cover the kernel inlays and second antennas.

6. A method of making an RFID article from label facestock having a first surface and an opposing surface, said method comprising:
    unwinding the label facestock from a source roll;
    forming a plurality of second antennas on said opposing surface of said label facestock in a first repeat;
    thereafter applying individual active kernels, each including a microchip and a first antenna to said opposing surface of said label facestock in an offset manner to, and in operative electromagnetic communication with, an associated second antenna;
    applying a release liner on the opposing surface of said facestock.

7. The method of claim 6 wherein said step of forming a plurality of second antennas comprises printing a series of second antennas on the opposing surface of said label facestock.

8. The method of claim 6 further comprising applying adhesive to said active kernels before applying them to the label facestock.

9. The method of claim 6 wherein each active kernel includes a base layer of poly film carrying said microchip and a metallic loop antenna.

10. The method of claim 6 further comprising the step of applying an adhesive coating to said opposing surface of said facestock prior to application of said active kernels thereto, wherein said step of applying active kernels comprises contacting said adhesive coated opposing surface of said label facestock with said active kernels.

11. The method of claim 10 further comprising a step of applying glue to an exposed surface of said active kernel after applying said active kernel to said adhesive coated surface of said label facestock.

* * * * *